April 11, 1933.  E. DOWALD  1,903,698

SPINDLE FOR WIRE COVERING MACHINES

Filed June 24, 1930

Inventor:
Eugen Dowald
By [signature], Attorney

Patented Apr. 11, 1933

1,903,698

UNITED STATES PATENT OFFICE

EUGEN DOWALD, OF WUPPERTAL-ELBERFELD, GERMANY

SPINDLE FOR WIRE COVERING MACHINES

Application filed June 24, 1930, Serial No. 463,408, and in Germany February 7, 1930.

The spindles for wire covering machines rotating on a vertical longitudinally bored axle are open to the objection in the known construction, that the lubrication of their bearing points can only be carried out when the spinner is standing still. Moreover as the bobbin axle is overhanging, that is only supported at the lower end, the spindles are subjected to considerable axle friction, which not only causes a great consumption of power for the covering machine but also an irregular revolving speed of the spindles, resulting in irregular covering of the wire, as the wire is drawn through the spindle at uniform speed. According to the invention the spindle has an oil hole at its lower end, from which the lubricant, pressed in by a squirt whilst the spindle is running, can be supplied to the bearing points. It is also new for the bearings of the thread bobbin carrier to be situated at a great distance apart on both ends of the thread bobbin and for the lubricant to be supplied first to the upper bearing through the pressure channels provided in the spindle axle, after which it runs over the outer surface thereof to the lower bearing. The pressure channels are longitudinal grooves in the spindle axle, which is enclosed by a sleeve.

The forcing in of the lubricant by a squirt ensures the lubricant reaching the bearing points and at the same time prevents clogging of the lubricating channels. The bearing of the bobbin carrying sleeve on both ends of the thread bobbin causes extremely quick and uniform running of the spindle.

An embodiment of the invention is illustrated by way of example in the accompanying drawing in which.

Figures 1, 2:
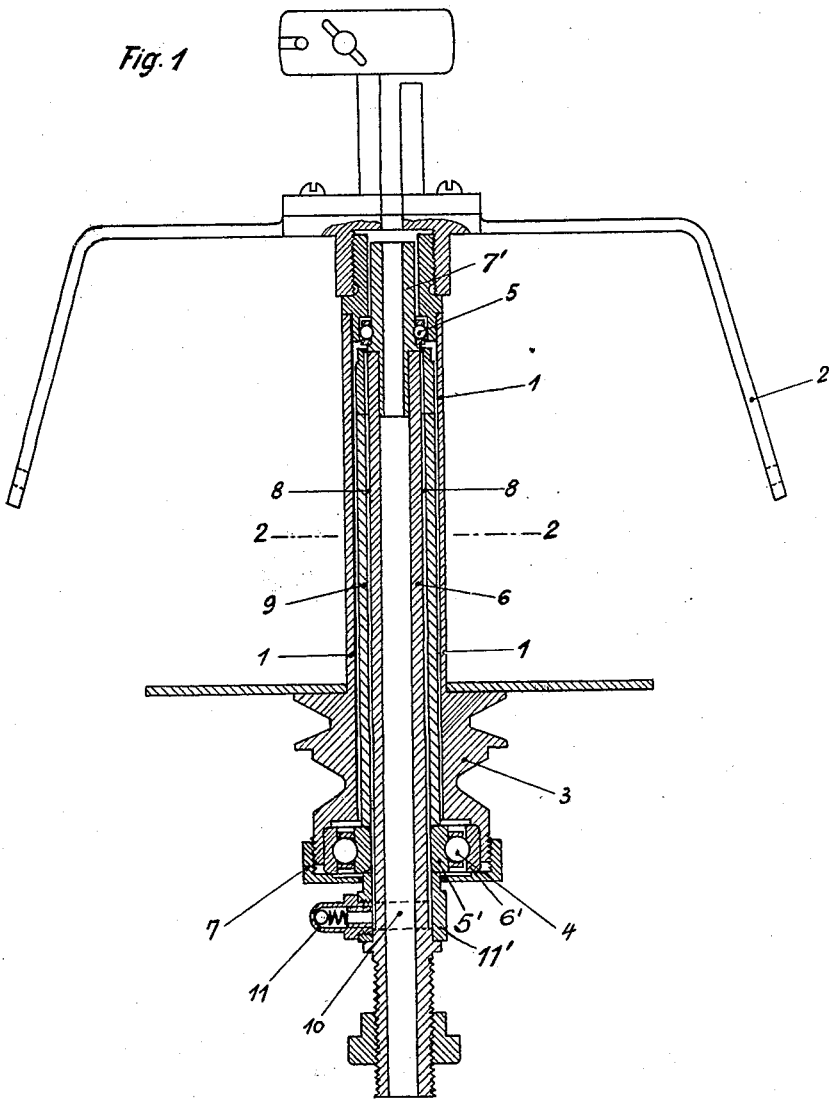
Fig. 1 shows the spindle in longitudinal section.
Fig. 2 is a cross-section on line 2—2 of Fig. 1.

The spinning arms 2 are mounted on the running sleeve 1 of the spindle on which the bobbin is placed. The running sleeve is driven by the groove pulley 3 and runs on the longitudinally bored axle core 6 by means of the lower ball bearing 4 and upper ball bearing 5. The inner race 5' of the lower ball bearing is mounted on the axle core 6, and its outer ring 6' is pressed tightly against the lower groove pulley 3 by the cap nut 7. The balls of the upper ball bearing 5 are situated only in a ball cage on an extension 7' at the upper end of the axle and run directly on the axle in an annular groove therein. Owing to the omission of the inner race in this ball bearing the bore of the axle may be as wide as possible.

The pressure channels 8 for the lubricant extend in the axle of the spindle in longitudinal direction and are formed by longitudinal grooves in the axle core 6 and by a sleeve 9 slipped thereover. The pressure channels terminate at their lower end in an annular groove 10 of the axle, and at their upper end in the upper ball bearing 5. An automatically closing lubricating nipple 11 with ball closure is carried by a short sleeve 11' placed on the outer side of the lubricating groove 10. The lubricant is forced by a squirt, adapted to be fitted on the nipple 11, through the channels 8 into the upper ball bearing 5 and the excess oil flows over the outer surface of the sleeve 9 into the lower ball bearing 4 and lubricates same.

The oil feed channels situated in the axle might be made in some other manner than that described. It is possible with the spindle described, to cover a rubber thread or any other thread instead of the wire in a similar manner.

I claim:—

1. In a spindle for wire covering machines, a stationary supporting shaft having a peripheral channel adjacent its lower end and provided with longitudinal grooves extending upwardly from the channel to the top of the shaft, a short sleeve on said shaft covering the channel and the lower portions of the grooves, an oil connection carried by the short sleeve and communicating with said channel, a ball bearing on said shaft immediately above said short sleeve and having an inner race fitting the shaft and forming an outer wall for said grooves immediately above the short sleeve, a long sleeve fitted on the shaft and extending from the ball bearing to the top of the shaft, an extension on the upper end of the shaft, a second ball bearing engaged on the extension, and a hollow spindle adapted to support a bobbin and supported on said bearings in spaced relation to said sleeves and extension.

2. In a spindle for wire covering machines, a stationary supporting shaft having a peripheral channel adjacent its lower end and provided with longitudinal grooves extending upwardly from the channel to the top of the shaft, a short sleeve on said shaft covering the channel and the lower portions of the grooves, an oil connection carried by the short sleeve and communicating with said channel, a ball bearing on said shaft immediately above said short sleeve and having an inner race fitting the shaft and forming an outer wall for said grooves immediately above the short sleeve, a long sleeve fitted on the shaft and extending from the ball bearing to the top of the shaft, an extension on the upper end of the shaft, a second ball bearing engaged on the extension, a hollow spindle adapted to support a bobbin and supported on said bearings in spaced relation to said sleeves and extension, said extension and shaft being tubular to provide a passage for the wire to be covered, and a cap on said hollow shaft carrying a pair of flyer arms and having an opening alined with the hollow shaft.

In testimony whereof I affix my signature.

EUGEN DOWALD.